United States Patent
Kim et al.

(10) Patent No.: US 8,420,257 B2
(45) Date of Patent: Apr. 16, 2013

(54) CAP ASSEMBLY COMPRISING GASKET PREVENTED FROM SAGGING

(75) Inventors: Sung Jong Kim, Daejeon (KR); Je Jun Lee, Daejeon (KR); Cha Hun Ku, Daejeon (KR)

(73) Assignee: LG Chem, Ltd., Seoul (KR)

( * ) Notice: Subject to any disclaimer, the term of this patent is extended or adjusted under 35 U.S.C. 154(b) by 88 days.

(21) Appl. No.: 12/861,334

(22) Filed: Aug. 23, 2010

(65) Prior Publication Data

US 2011/0086251 A1    Apr. 14, 2011

Related U.S. Application Data

(63) Continuation of application No. PCT/KR2009/008012, filed on Dec. 31, 2009.

(30) Foreign Application Priority Data

Oct. 13, 2009    (KR) .................. 10-2009-0097008

(51) Int. Cl.
*H01M 2/10* (2006.01)
*H01M 2/12* (2006.01)

(52) U.S. Cl.
USPC .............................. 429/185; 429/53; 429/82

(58) Field of Classification Search ........... 429/53, 429/82, 185
See application file for complete search history.

(56) References Cited

U.S. PATENT DOCUMENTS

| | | | | |
|---|---|---|---|---|
| 6,620,544 | B1 * | 9/2003 | Shin et al. | 429/56 |
| 6,649,301 | B1 * | 11/2003 | Oh et al. | 429/56 |
| 6,777,128 | B2 * | 8/2004 | Kim | 429/54 |
| 7,378,187 | B2 | 5/2008 | Kim | |
| 7,601,455 | B2 * | 10/2009 | Yoon | 429/72 |
| 2006/0286447 | A1 | 12/2006 | Kim | |
| 2007/0212595 | A1 | 9/2007 | Kim et al. | |

FOREIGN PATENT DOCUMENTS

| | | |
|---|---|---|
| KR | 10-2006-0037832 A | 5/2006 |
| KR | 10-0709870 B1 | 4/2007 |
| KR | 10-2008-0036248 A | 4/2008 |
| KR | 10-2008-0058966 A | 6/2008 |
| KR | 10-0878701 B1 | 1/2009 |
| KR | 10-1054748 B1 | 8/2011 |

\* cited by examiner

*Primary Examiner* — Tracy Dove
(74) *Attorney, Agent, or Firm* — Birch, Stewart, Kolasch & Birch, LLP

(57) ABSTRACT

A cap assembly is provided. The cap assembly comprises a main gasket surrounding the outer circumference of a safety vent and an auxiliary gasket surrounding the outer circumference of a current interrupt device (CID). The main gasket is supported by the auxiliary gasket, leaving no space between the main gasket and the safety vent. The cap assembly is constructed such that the auxiliary gasket prevents the main gasket seated on a beading portion from sagging. This construction makes the cap assembly effective in preventing an electrolyte from leaking. Further provided is a cylindrical secondary battery comprising the cap assembly.

6 Claims, 3 Drawing Sheets

CONVENTIONAL ART

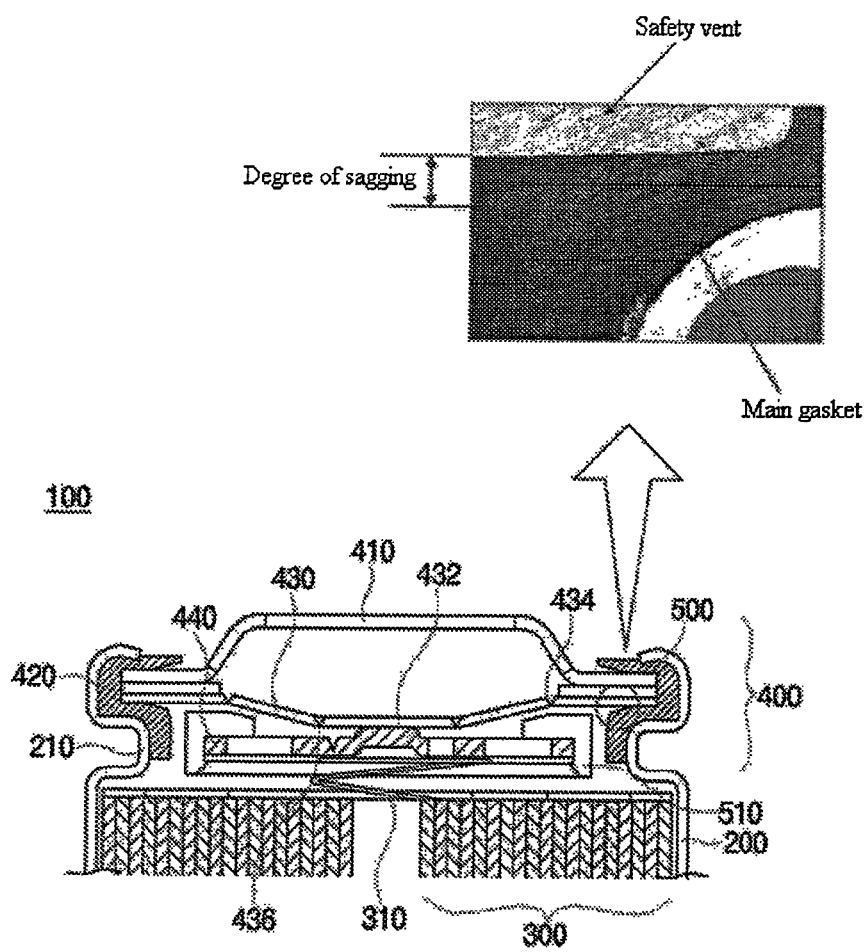
CONVENTIONAL ART

CAP ASSEMBLY COMPRISING GASKET PREVENTED FROM SAGGING

This application is a Continuation of PCT International Application No. PCT/KR2009/008012 filed on Dec. 31, 2009, which claims the benefit of Patent Application No. 10-2009-0097008 filed in Republic of Korea, on Oct. 13, 2009. The entire contents of all of the above applications is hereby incorporated by reference into the present application.

BACKGROUND OF THE INVENTION

1. Field of the Invention

The present invention relates to a cap assembly comprising a gasket prevented from sagging and a cylindrical secondary battery comprising the cap assembly.

2. Description of the Related Art

Secondary batteries are classified into cylindrical, prismatic and pouch types by the shape of battery cases they employ. Generally, a cylindrical secondary battery includes an electrode assembly accommodated in a cylindrical metal can, a prismatic battery includes an electrode assembly accommodated in a prismatic metal can, and a pouch type battery includes an electrode assembly accommodated in a pouch type case made of an aluminum laminate sheet.

The electrode assemblies accommodated in the battery cases are power generating devices capable of repeated charge-discharge cycles. Each of the electrode assemblies has a stack structure of a positive electrode, a separator and a negative electrode. Electrode assemblies are classified into jelly-roll and stack types by their structure. A jelly-roll type electrode assembly is constructed by interposing a separator between long sheet-like positive and negative electrodes, to which respective active materials are applied, and winding the laminate. A stack type electrode assembly is constructed by sequentially stacking a plurality of electrode units, each of which includes a positive electrode having a predetermined size, a negative electrode having a predetermined size and a separator interposed between the electrodes. Jelly-roll type electrode assemblies are most widely used in secondary batteries due to their advantages, including ease of construction and high energy density per unit weight. Jelly-roll type electrode assemblies are commonly employed in cylindrical batteries.

A jelly-roll type electrode assembly undergoes repeated expansion and contraction during charge and discharge, and as a result, it tends to deform. In the course of the charge and discharge, stress is concentrated at the central portion of the electrode assembly to cause the electrodes to penetrate the separator and is in contact with a central metal pin, resulting in internal short circuits. Heat caused by the short circuits decomposes an organic solvent present in the battery to evolve gas. The gas increases the internal pressure of the battery, resulting in rupture of the battery. Further, the internal pressure of the battery may increase when internal short circuits are caused by an external impact applied to the battery.

Attempts have been made to solve the safety problems of batteries. For example, a cap assembly of a cylindrical battery is known in which a safety vent for exhausting high-pressure gas, safety devices, such as a positive temperature coefficient (PTC) thermistor for interrupting current at high temperature and a current interrupt device (CID) for interrupting current when the internal pressure of the battery increases, a top cap forming a protruding terminal to protect the safety devices, etc. are fixed together by a main gasket.

In the structure of the cap assembly, the main gasket surrounds the outer circumferences of the safety vent, the PTC thermistor, the top cap, etc. to prevent an electrolyte present in the battery from leaking out of the cap assembly. So long as the electrolyte does not leak through the interface between the safety vent positioned at the innermost portion of the battery and the main gasket surrounding the outer circumference of the safety vent, no electrolyte leakage occurs through the interfaces between the metallic parts, such as the interface between the safety vent and the PTC thermistor and the interface between the PTC thermistor and the top cap.

However, a portion of the electrolyte substantially leaks through the interface between the main gasket and the safety vent during charging and discharging operations of the battery or when the battery falls down or an external impact is applied to the battery. Once the electrolyte leaks through the interface between the main gasket and the safety vent, it leaks easily from the battery through the interfaces between the metallic parts. That is, due to relatively weak adhesiveness at the interfaces between the metallic parts, the electrolyte entering the interfaces between the metallic parts can leak out of the cap assembly through the interfaces between the metallic parts more easily than through the interfaces between the main gasket and the adjacent devices.

Thus, there is a strong need to develop a technique for reducing the leakage of electrolyte out of a cap assembly.

In this connection, Japanese Unexamined Patent Publication Nos. 2006-286561, 2005-100927 and 2002-373711 disclose cap assemblies, each of which includes a top cap disposed on a main gasket. However, the main gaskets surrounding the outer circumferences of safety devices have complicated shapes difficult to produce, and electrolytes leak from the interfaces between metallic parts (e.g., safety vents, PTC thermistors and top caps). That is, the cap assemblies disclosed in the patent publications fail to provide satisfactory solutions to the above-mentioned problems.

FIG. 1a is a schematic partial cross-sectional view illustrating an upper structure of a conventional cylindrical secondary battery 100.

Referring to FIG. 1a, the battery 100 is fabricated by inserting an electrode assembly 300 as a power generating device into a can 200, injecting an electrolyte into the can, and mounting a cap assembly 400 on an upper opening of the can 200. A main gasket 500 is mounted on an upper beading portion 210 of the can 200 to hermetically seal the can 200. The cap assembly 400 includes a top cap 410, a PTC thermistor 420 for interrupting an overcurrent and a safety vent 430 for decreasing the internal pressure of the battery. The elements of the cap assembly 400 are brought into close contact with each other inside the cap assembly 400.

The central portion of the top cap 410 protrudes upward. Due to this structure, the top cap 410 serves as a positive terminal to which an external circuit is connected. The top cap 410 has a plurality of through-holes (not shown) through which gas is released. The safety vent 430 has a lower end to which a positive electrode of the electrode assembly 300 is connected through a current interrupt device 440 and a positive lead 310.

The safety vent 430 is made of a thin conductive plate and has a downwardly indented portion 432 at a central portion thereof. The indented portion 432 has an upper bent portion and a lower bent portion in which two notches 434 and 436 having different depths are formed, respectively.

The current interrupt device 440 is made of a conductive plate and is installed under the safety vent 430 to interrupt current when the internal pressure of the battery increases above a critical value. The current interrupt device 440 is preferably made of the same material as the safety vent 430. An auxiliary gasket 510 is made of a polypropylene (PP) resin to prevent the current interrupt device 440 from being in electrical communication with the safety vent 430.

For example, when the battery is internally short-circuited or overcharged by various factors, the temperature of the battery 100 increases. The increased temperature leads to an increase in the resistance of the PTC thermistor 420, which greatly decreases the amount of current flowing through the PTC thermistor 420. A continuous increase in the temperature of the battery 100 decomposes the electrolyte, and as a result, gas is produced. The gas increases the internal pressure of the battery to lift the indented portion 432 of the safety vent 430, resulting in partial rupture of the current interrupt device 440. This rupture enables the current interrupt device 440 to interrupt current, thus ensuring the safety of the battery 100. When the pressure is continuously increased, the notches 436 of the safety vent 430 are ruptured. As a result, the high-pressure gas is released to the outside, thus ensuring the safety of the battery 100.

An electrolyte may leak through various portions (for example, the interface between a gasket and a safety vent) of a battery. Particularly, a main gasket surrounding a top cap, a PTC thermistor and a safety vent may not be in close contact with the safety vent at one end thereof. The elasticity of the main gasket may deteriorate during use of the battery. The inelastic portion of the main gasket may sag by gravity, and as a result, the main gasket is not in close contact with the safety vent.

It is ideal that no sagging of the main gasket occurs, as illustrated in FIG. 1a. However, in an actual case, the main gasket sags downward and is spaced from the safety vent, as illustrated in FIG. 1b.

FIG. 1b schematically illustrates an inner portion of a conventional cylindrical secondary battery in which a main gasket sags. FIG. 1b also shows a magnified image of the sagging state of the main gasket. From the image, it can be visually observed that an end portion of the main gasket sags in the gravity direction, leaving a space between the main gasket and the safety vent.

The space formed between the main gasket and the safety vent becomes a major path through which an electrolyte present in the battery escapes.

SUMMARY OF THE INVENTION

The present inventors have conducted intensive research and repeated experiments to solve the aforementioned problems, and as a result, have found that when a battery is fabricated in such a manner that a main gasket is supported by an auxiliary gasket surrounding the outer circumference of a current interrupt device, no space is formed between the main gasket and a safety vent so that an electrolyte can be prevented from leaking out of a cap assembly, eventually resulting in a marked improvement in the stability of the battery. The present invention has been accomplished based on this finding.

In view of the foregoing and other problems of the prior art, an object of the present invention is to provide a cap assembly that can completely prevent leakage of electrolyte.

Another object of the present invention is to provide a cylindrical battery comprising the cap assembly.

According to an aspect of the present invention, there is provided a cap assembly comprising a main gasket surrounding the outer circumference of a safety vent and an auxiliary gasket surrounding the outer circumference of a current interrupt device (CID) wherein the main gasket is supported by the auxiliary gasket to leave no space between the main gasket and the safety vent.

In an embodiment, a portion of the main gasket is seated on the CID and is supported upward by the auxiliary gasket.

In an embodiment, the CID, whose outer circumference is surrounded by the auxiliary gasket, is press-fitted into the main gasket to allow the auxiliary gasket to laterally support the main gasket.

In an embodiment, the main gasket sags a distance of up to 0.12 mm.

According to another aspect of the present invention, there is provided a cylindrical secondary battery comprising the cap assembly.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1b is a schematic cross-sectional view illustrating a state of a conventional cylindrical secondary battery in which a main gasket sags;

DETAILED DESCRIPTION OF THE INVENTION

Exemplary embodiments of the present invention will now be described in detail.

The present invention provides a cap assembly comprising a main gasket surrounding the outer circumference of a safety vent and an auxiliary gasket surrounding the outer circumference of a current interrupt device (CID) wherein the main gasket is supported by the auxiliary gasket to leave no space between the main gasket and the safety vent.

The main gasket may surround the outer circumference of a stack of the safety vent with a top cap and the CID whose outer circumference is surrounded by the auxiliary gasket may be joined to the bottom of the safety vent.

The cap assembly of the present invention is characterized in that the auxiliary gasket supports the main gasket to prevent the main gasket from sagging downward by some factors, such as gravity, leaving no space between the main gasket and the safety vent.

The present invention proposes the following non-limiting embodiments.

Figure 2A:
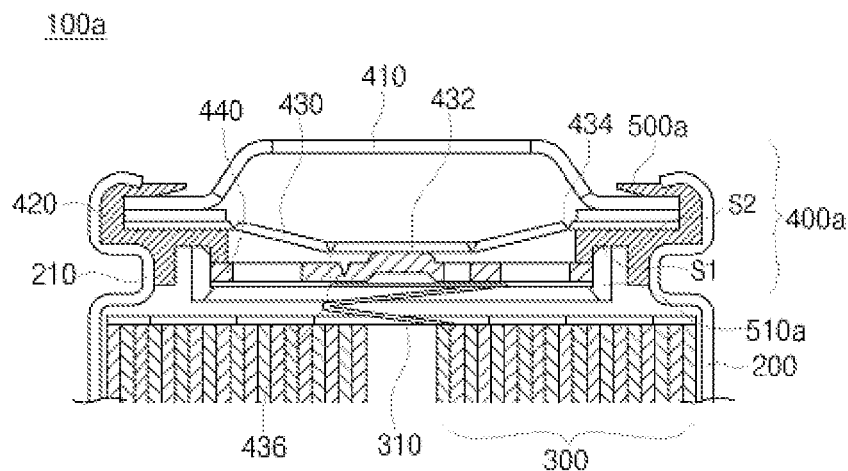
FIG. 2a is a cross-sectional view illustrating an upper structure of a cylindrical secondary battery according to an embodiment of the present invention.

In an embodiment illustrated in FIG. 2a, a portion of the main gasket 500a is seated on the CID 440 and is supported upward by the auxiliary gasket 510a.

As illustrated in FIG. 2a, the partial supporting of the main gasket 500a by the auxiliary gasket 510a prevents the main gasket 500a from sagging from the safety vent 430 and effectively prevents an electrolyte present in the battery 100a from leaking through an interface S1 between the main gasket 500a and the auxiliary gasket 510a and an interface S2 between the main gasket 500a and the safety vent 430, achieving double sealing of the electrolyte. That is, it is substantially difficult for the electrolyte to leak out of the cap assembly 100a through the interfaces S1 and S2.

Figure 2B:
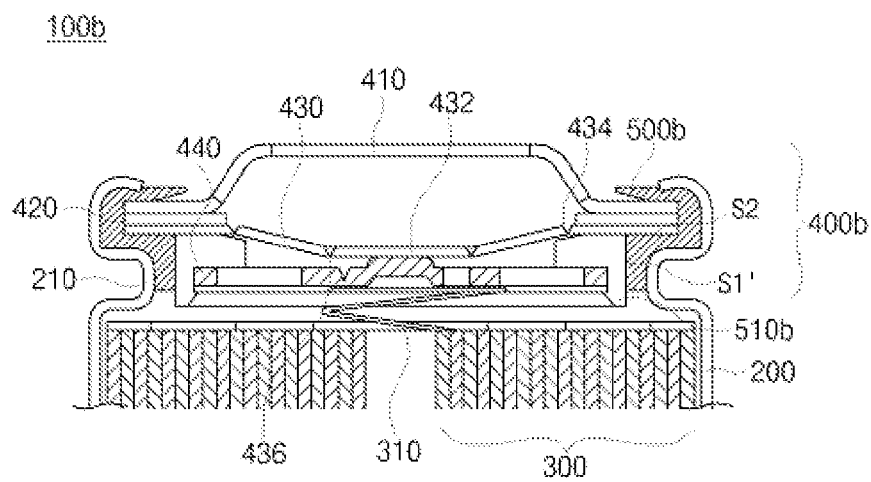
FIG. 2b is a cross-sectional view illustrating an upper structure of a cylindrical secondary battery according to another embodiment of the present invention.

In another embodiment illustrated in FIG. 2b, the CID, whose outer circumference is surrounded by the auxiliary gasket, may be press-fitted into the main gasket 500b to allow the auxiliary gasket 510b to laterally support the main gasket 500b.

As illustrated in FIG. 2b, the auxiliary gasket 510b pushes and supports the lateral side of the main gasket 500b. Such pushing and supporting prevents the main gasket 500b from sagging from the safety vent 430 and effectively prevents an electrolyte present in the battery 100b from leaking through an interface S1' between the main gasket 500b and the auxiliary gasket 510b and an interface S2 between the main gasket 500b and the safety vent 430, achieving double sealing of the electrolyte. In other words, it is substantially difficult for the electrolyte to leak out of the cap assembly 100b through the interfaces S1' and S2.

The term 'press-fitted' used herein means that a part (e.g., a shaft) is forcibly fitted into a clearance of a portion (e.g., a hole). The term is a terminology widely used in the field of mechanical design engineering.

The auxiliary gasket 510a or 510b structurally supports the main gasket 500a or 500b and can maintain the degree of sagging of the main gasket 500a or 500b from the safety vent at 0.12 mm or less.

The present invention also provides a cylindrical secondary battery comprising the cap assembly.

The cylindrical secondary battery of the present invention has the same constitution as a conventional cylindrical secondary battery, which can be found in the above "Background of the invention" section, except for the specially designed cap assembly illustrated in FIG. 2a or 2b.

Although the present invention has been described herein with reference to the accompanying drawings illustrating the foregoing embodiments, one of ordinary skill in the art will appreciate that various modifications and variations are possible in light of the above teachings, without departing from the spirit and scope of the present invention.

TEST EXAMPLES

Electrolyte Leakage According to Degree of Sagging

The performance characteristics of the inventive and comparative cap assemblies were verified by the following three tests.

1. Measurement of Degree of Sagging

Figure 1A:
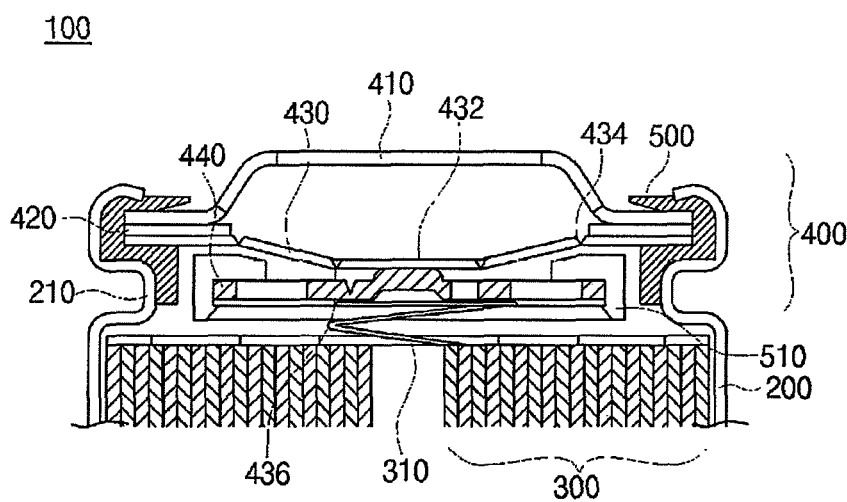
FIG. 1a is a cross-sectional view illustrating an upper structure of a conventional cylindrical secondary battery.

The inventive battery of FIG. 2a and the comparative battery of FIG. 1a were measured for degree of sagging. The degree of sagging in each of the batteries is defined as a maximum distance between the gasket and the safety vent, and it is expressed in mm.

As for the inventive battery, the degree of sagging was measured to be as small as 0.1-0.12 with an insignificant difference. As for the comparative battery, the degree of sagging was measured to be as large as 0.15-0.25 with a significant difference.

2. Pressure Leak Test

After an electrolyte was injected into each of the inventive and comparative batteries, the battery was pressurized with nitrogen gas. An observation was made as to whether or not the electrolyte leaked from the battery. The pressure of the gas applied to the cap assembly was adjusted to about 18 kgf/cm$^2$.

3. Drop Test

Thirty inventive cylindrical batteries and thirty comparative cylindrical batteries were used for drop testing. After each of the batteries continuously fell down on a wooden floor from a height of about 1 m in such a manner that the upper portion (i.e. the portion on which the cap assembly was seated) of the battery collided with the floor (first step), one side of the battery collided with the floor (second step) and the lower portion of the battery collided with the floor (third step), an observation was made as to the occurrence of electrolyte leakage. The series of the three steps was defined as one cycle.

The test results are shown in Table 1.

TABLE 1

| | Degree of sagging (mm) | Pressure leak test | Drop test |
|---|---|---|---|
| Example 1 | 0.10 | 0/30* | 0/30* |
| Example 2 | 0.12 | 0/30* | 0/30* |
| Comparative Example 1 | 0.15 | 0/30* | 3/30* |
| Comparative Example 2 | 0.17 | 9/30* | 14/30* |
| Comparative Example 3 | 0.20 | 18/30* | 23/30* |
| Comparative Example 4 | 0.25 | 26/30* | 30/30* |

*Number of batteries from which electrolyte leaked/Total number of batteries tested The results in Table 1 show that the inventive batteries had better ability to seal the electrolyte than the comparative batteries. These results can be considered as data estimating that there is a correlation between the degree of leakage of electrolyte under pressure and the degree of leakage of electrolyte upon impact according to the degree of sagging in the batteries. Therefore, it can be understood from the test examples that the inventive cap assemblies, in which the auxiliary gasket prevents the main gasket from sagging, and the cylindrical secondary batteries comprising the cap assemblies have good ability to seal electrolytes.

As is apparent from the above description, the cap assembly of the present invention is constructed such that the auxiliary gasket surrounding the outer circumference of the CID prevents the main gasket seated on a beading portion from sagging. This construction makes the cap assembly of the present invention effective in preventing an electrolyte from leaking.

What is claimed is:

1. A cap assembly comprising a main gasket surrounding the outer circumference of a safety vent and an auxiliary gasket surrounding the outer circumference of a current interrupt device (CID) wherein a portion of the main gasket is seated on the CID and is supported upwardly by the auxiliary gasket to minimize the amount the main gasket sags away from the safety vent.

2. The cap assembly of claim 1, wherein the main gasket sags a distance of up to 0.12 mm.

3. A cylindrical secondary battery comprising the cap assembly of claim 1.

4. A cap assembly comprising a main gasket surrounding the outer circumference of a safety vent and an auxiliary gasket surrounding the outer circumference of a current interrupt device (CID) wherein the CID is press-fittedly mounted to the main gasket and is in direct contact with the auxiliary gasket to allow the auxiliary gasket to laterally support the main gasket.

5. The cap assembly of claim 4, wherein the main gasket sags a distance of up to 0.12 mm.

6. A cylindrical secondary battery comprising the cap assembly of claim 4.

* * * * *